United States Patent
Zeine et al.

(10) Patent No.: US 11,025,080 B2
(45) Date of Patent: Jun. 1, 2021

(54) DUAL-MODE ENERGY HARVESTING WIRELESS POWER RECEIVER APPARATUS WITH SELF-REVIVING CAPABILITIES

(71) Applicant: Ossia Inc., Bellevue, WA (US)

(72) Inventors: Hatem Ibrahim Zeine, Bellevue, WA (US); Benjamin Todd Renneberg, Lake Tapps, WA (US)

(73) Assignee: Ossia Inc., Redmond, WA (US)

( * ) Notice: Subject to any disclaimer, the term of this patent is extended or adjusted under 35 U.S.C. 154(b) by 462 days.

(21) Appl. No.: 15/942,781

(22) Filed: Apr. 2, 2018

(65) Prior Publication Data
US 2018/0287418 A1 Oct. 4, 2018

Related U.S. Application Data

(60) Provisional application No. 62/480,083, filed on Mar. 31, 2017.

(51) Int. Cl.
*H02J 7/02* (2016.01)
*H02J 50/80* (2016.01)
*H02J 50/40* (2016.01)
*H02J 50/20* (2016.01)

(52) U.S. Cl.
CPC .............. *H02J 7/025* (2013.01); *H02J 50/20* (2016.02); *H02J 50/40* (2016.02); *H02J 50/80* (2016.02)

(58) Field of Classification Search
CPC ...................................................... H02J 7/025
USPC .......................................................... 320/108
See application file for complete search history.

(56) References Cited

U.S. PATENT DOCUMENTS

| | | | | |
|---|---|---|---|---|
| 9,477,292 B1 * | 10/2016 | Murali | ................ | G06F 9/4418 |
| 2009/0058361 A1 * | 3/2009 | John | ................ | H02J 50/80 |
| | | | | 320/128 |
| 2013/0328416 A1 * | 12/2013 | Whitworth | ................ | F03G 5/06 |
| | | | | 307/149 |
| 2017/0180075 A1 * | 6/2017 | Gollakota | ................ | H02J 50/001 |

* cited by examiner

*Primary Examiner* — Jerry D Robbins

(57) ABSTRACT

Embodiments of the present disclosure describe systems, methods, and apparatuses for reviving a wireless power receiver client over-the-air. More specifically, dual-mode active/passive wireless power receiver clients are described that can passively harvest RF energy in order to obtain enough energy to rejoin a wireless power network where the client can actively harvest RF energy (the client receives directed or isolated wireless power from a wireless power transmission system). For example, a wireless power receiver client can harvest RF energy while idle or off, e.g., when no beacon or other communications are being sent or received, or, in some instances, asynchronously in order to compliment and/or protect one or more elements of the system such as, for example a radio transceiver.

20 Claims, 15 Drawing Sheets

DUAL-MODE ENERGY HARVESTING WIRELESS POWER RECEIVER APPARATUS WITH SELF-REVIVING CAPABILITIES

CROSS-REFERENCE TO RELATED APPLICATION

This application claims priority to and benefit from U.S. Provisional Patent Application No. 62/480,083 titled "Method of Revival of a Dead Battery Over-The-Air" filed on Mar. 31, 2017, which is expressly incorporated by reference herein.

BACKGROUND

Many portable electronic devices are powered by batteries. Rechargeable batteries are often used to avoid the cost of replacing conventional dry-cell batteries and to conserve precious resources. However, recharging batteries with conventional rechargeable battery chargers requires access to an alternating current (AC) power outlet, which is sometimes not available or not conveniently co-located. It would, therefore, be desirable to derive recharging battery power for a client device battery from electromagnetic (EM) radiation.

Accordingly, a need exists for technology that overcomes the problem demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
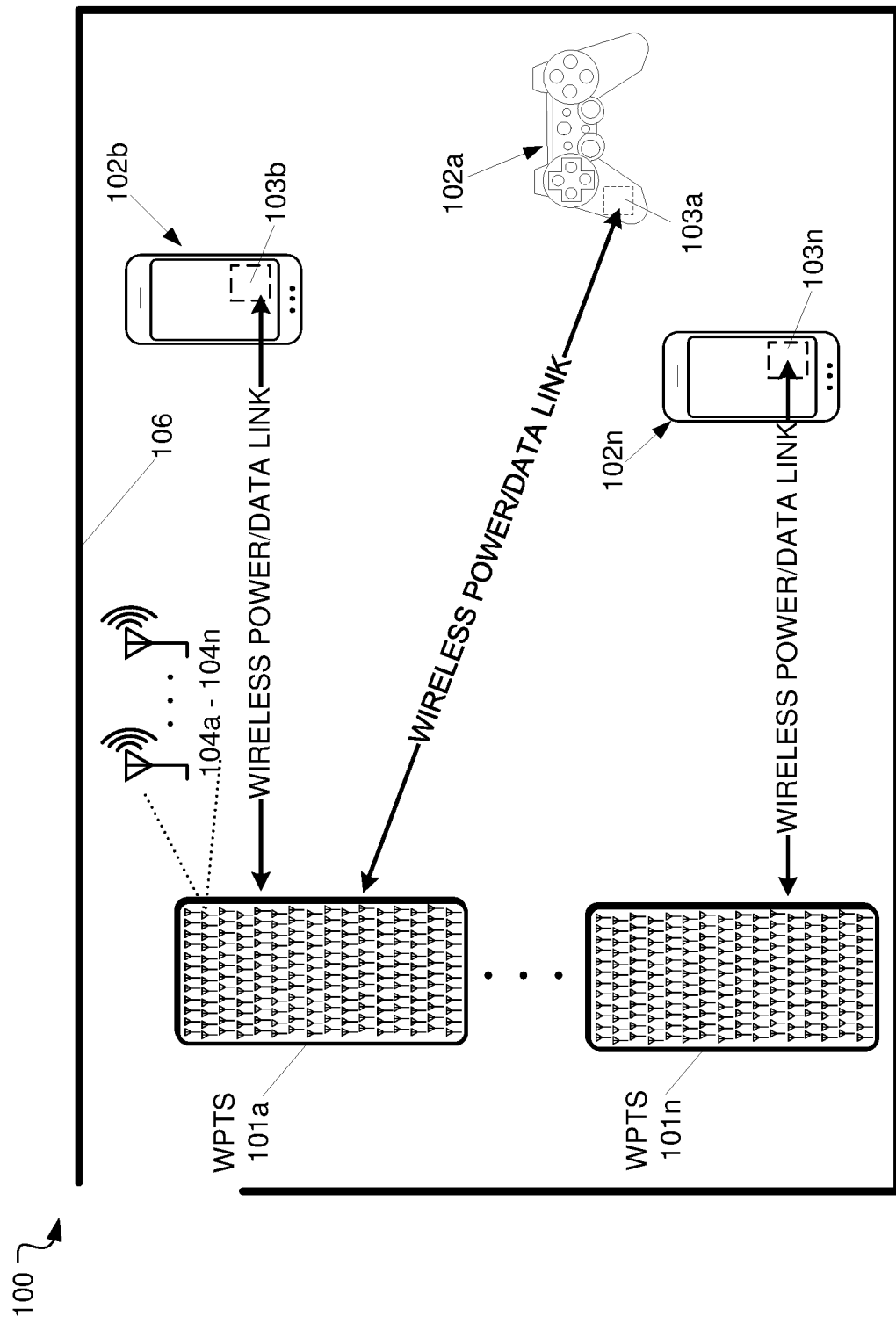
FIG. 1 depicts a block diagram including an example wireless power delivery environment illustrating wireless power delivery from one or more wireless power transmission systems to various wireless devices within the wireless power delivery environment in accordance with some embodiments.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

When a traditional wireless power receiver client's battery (or energy storage module) is very low or empty, the client cannot transmit a beacon signal to a wireless power transmission system in order to receive directed (or isolated) wireless power for recharging. Consequently, the client is non-functional until plugged in, or until placed in a relatively high radio frequency (RF) energy field designed to charge the battery.

Embodiments of the present disclosure describe systems, methods, and apparatuses for reviving a wireless power receiver client over-the-air. More specifically, dual-mode active/passive wireless power receiver clients are described that can passively harvest RF energy in order to obtain enough energy to rejoin a wireless power network where the client can actively harvest RF energy (the client receives directed or isolated wireless power from a wireless power transmission system). For example, a wireless power receiver client can harvest RF energy while idle or off, e.g., when no beacon or other communications are being sent or received, or, in some instances, asynchronously in order to compliment and/or protect one or more elements of the system such as, for example a radio transceiver.

In some embodiments, the wireless power receiver client transitions to an ultra-low-power state where the client harvests ambient RF energy to charge an energy storage device or unit such as, for example, a battery or a capacitor. After a predetermined amount of energy, e.g., wake-up threshold, is harvested, the wireless power receiver client can then attempt to wake-up and establish communications with or join a wireless power network. If sufficient power is received from a wireless power transmission system for maintaining an active (or an awake state), then the wireless power receiver client can continue normal operation. Otherwise, the wireless power receiver client returns to the ultra-low-power state and continues to harvest ambient RF energy in a passive harvest mode. In some embodiments, the wake-up threshold value may be adjusted responsive to one or more successive failed wake-up attempts. For example, the threshold value may be dynamically increased or incremented, e.g., a back-off timer, to reduce interference in areas with several RF devices or to ensure sufficient energy is stored for a longer wake-up attempt.

FIG. 1 depicts a block diagram including an example wireless power delivery environment 100 illustrating wireless power delivery from one or more wireless power transmission systems (WPTS) 101a-n (also referred to as "wireless power delivery systems", "antenna array systems" and "wireless chargers") to various wireless devices 102a-n within the wireless power delivery environment 100, according to some embodiments. More specifically, FIG. 1 illustrates an example wireless power delivery environment 100 in which wireless power and/or data can be delivered to available wireless devices 102a-102n having one or more wireless power receiver clients 103a-103n (also referred to herein as "clients" and "wireless power receivers"). The wireless power receiver clients are configured to receive and process wireless power from one or more wireless power transmission systems 101a-101n. Components of an example wireless power receiver client 103 are shown and discussed in greater detail with reference to FIG. 4.

As shown in the example of FIG. 1, the wireless devices 102a-102n include mobile phone devices and a wireless game controller. However, the wireless devices 102a-102n can be any device or system that needs power and is capable of receiving wireless power via one or more integrated wireless power receiver clients 103a-103n. As discussed herein, the one or more integrated wireless power receiver clients receive and process power from one or more wireless power transmission systems 101a-101n and provide the power to the wireless devices 102a-102n (or internal batteries of the wireless devices) for operation thereof.

Each wireless power transmission system 101 can include multiple antennas 104a-n, e.g., an antenna array including hundreds or thousands of antennas, which are capable of delivering wireless power to wireless devices 102a-102n. In some embodiments, the antennas are adaptively-phased RF antennas. The wireless power transmission system 101 is capable of determining the appropriate phases with which to deliver a coherent power transmission signal to the wireless power receiver clients 103a-103n. The array is configured to emit a signal (e.g., continuous wave or pulsed power transmission signal) from multiple antennas at a specific phase relative to each other. It is appreciated that use of the term "array" does not necessarily limit the antenna array to any specific array structure. That is, the antenna array does not need to be structured in a specific "array" form or geometry. Furthermore, as used herein the term "array" or "array system" may include related and peripheral circuitry for signal generation, reception and transmission, such as radios, digital logic and modems. In some embodiments, the wireless power transmission system 101 can have an embedded Wi-Fi hub for data communications via one or more antennas or transceivers.

The wireless devices 102 can include one or more wireless power receiver clients 103. As illustrated in the example of FIG. 1, power delivery antennas 104a-104n are shown. The power delivery antennas 104a are configured to provide delivery of wireless radio frequency power in the wireless power delivery environment. In some embodiments, one or more of the power delivery antennas 104a-104n can alternatively or additionally be configured for data communications in addition to or in lieu of wireless power delivery. The one or more data communication antennas are configured to send data communications to and receive data communications from the wireless power receiver clients 103a-103n and/or the wireless devices 102a-102n. In some embodiments, the data communication antennas can communicate via Bluetooth™, Wi-Fi™, ZigBee™, etc. Other data communication protocols are also possible.

Each wireless power receiver client 103a-103n includes one or more antennas (not shown) for receiving signals from the wireless power transmission systems 101a-101n. Likewise, each wireless power transmission system 101a-101n includes an antenna array having one or more antennas and/or sets of antennas capable of emitting continuous wave or discrete (pulse) signals at specific phases relative to each other. As discussed above, each of the wireless power transmission systems 101a-101n is capable of determining the appropriate phases for delivering the coherent signals to the wireless power receiver clients 102a-102n. For example, in some embodiments, coherent signals can be determined by computing the complex conjugate of a received beacon (or calibration) signal at each antenna of the array such that the coherent signal is phased for delivering power to the particular wireless power receiver client that transmitted the beacon (or calibration) signal.

Although not illustrated, each component of the environment, e.g., wireless device, wireless power transmission system, etc., can include control and synchronization mechanisms, e.g., a data communication synchronization module. The wireless power transmission systems 101a-101n can be connected to a power source such as, for example, a power outlet or source connecting the wireless power transmission systems to a standard or primary AC power supply in a building. Alternatively, or additionally, one or more of the wireless power transmission systems 101a-101n can be powered by a battery or via other mechanisms, e.g., solar cells, etc.

The wireless power receiver clients 102a-102n and/or the wireless power transmission systems 101a-101n are configured to operate in a multipath wireless power delivery environment. That is, the wireless power receiver clients 102a-102n and the wireless power transmission systems 101a-101n are configured to utilize reflective objects 106 such as, for example, walls or other RF reflective obstructions within range to transmit beacon (or calibration) signals and/or receive wireless power and/or data within the wireless power delivery environment. The reflective objects 106 can be utilized for multi-directional signal communication regardless of whether a blocking object is in the line of sight between the wireless power transmission system and the wireless power receiver clients 103a-103n.

As described herein, each wireless device 102a-102n can be any system and/or device, and/or any combination of devices/systems that can establish a connection with another device, a server and/or other systems within the example environment 100. In some embodiments, the wireless devices 102a-102n include displays or other output functionalities to present data to a user and/or input functionalities to receive data from the user. By way of example, a wireless device 102 can be, but is not limited to, a video game controller, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. By way of example and not limitation, the wireless device 102 can also be any wearable device such as watches, necklaces, rings or even devices embedded on or within the customer. Other examples of a wireless device 102 include, but are not limited to, safety sensors (e.g., fire or carbon monoxide), electric toothbrushes, electronic door lock/handles, electric light switch controller, electric shavers, etc.

Although not illustrated in the example of FIG. 1, the wireless power transmission system 101 and the wireless power receiver clients 103a-103n can each include a data communication module for communication via a data channel. Alternatively, or additionally, the wireless power receiver clients 103a-103n can direct the wireless devices 102a-102n to communicate with the wireless power transmission system via existing data communications modules.

In some embodiments, the beacon signal, which is primarily referred to herein as a continuous waveform, can alternatively or additionally take the form of a modulated signal.

Figure 2:
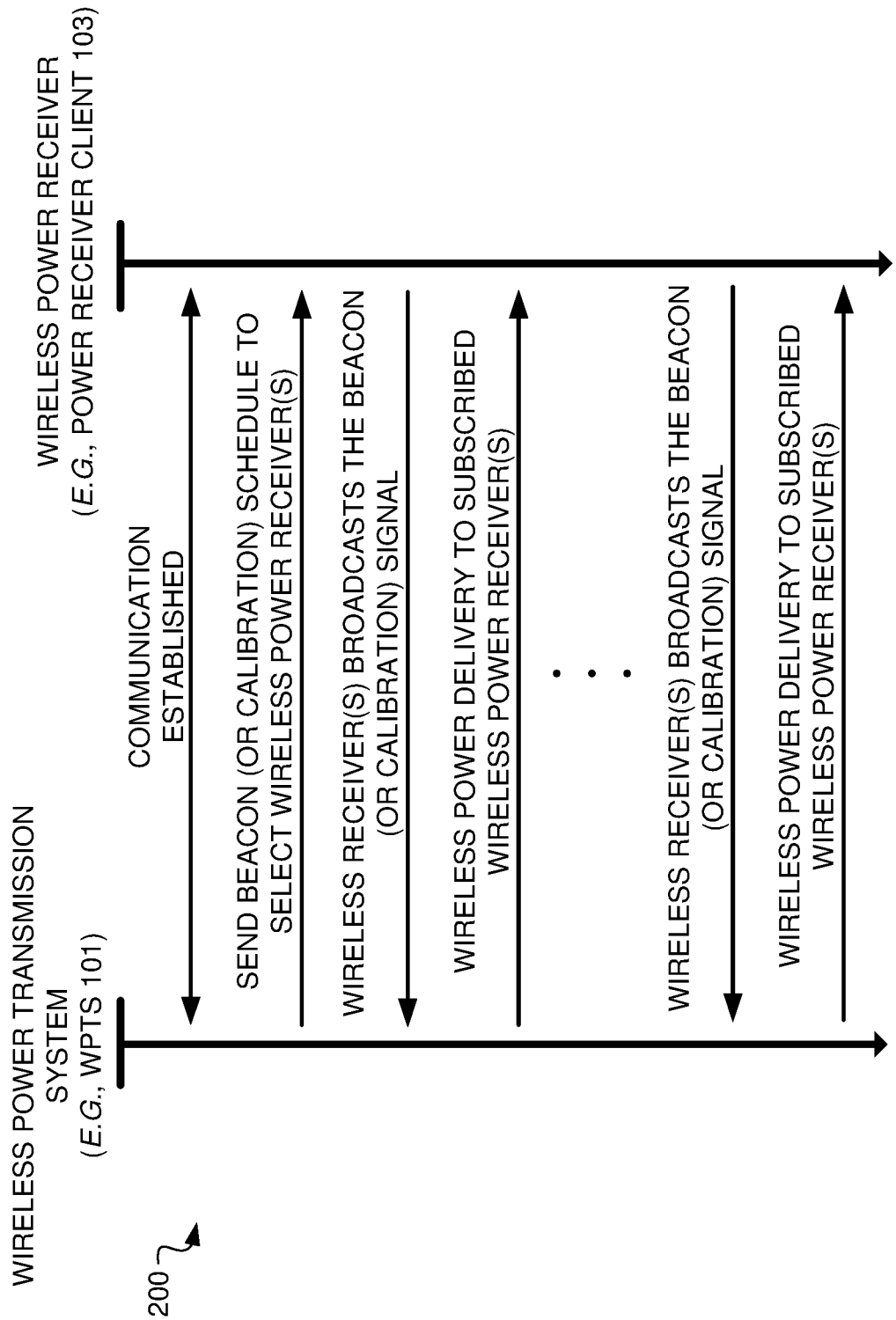
FIG. 2 depicts a sequence diagram illustrating example operations between a wireless power transmission system and a wireless receiver client for commencing wireless power delivery in accordance with some embodiments.

FIG. 2 depicts a sequence diagram 200 illustrating example operations between a wireless power delivery system (e.g., WPTS 101) and a wireless power receiver client (e.g., wireless power receiver client 103) for establishing wireless power delivery in a multipath wireless power delivery, according to an embodiment. Initially, communication is established between the wireless power transmission system 101 and the power receiver client 103. The initial communication can be, for example, a data communication link that is established via one or more antennas 104 of the wireless power transmission system 101. As discussed, in some embodiments, one or more of the antennas 104a-104n can be data antennas, wireless power transmission antennas, or dual-purpose data/power antennas. Various information can be exchanged between the wireless power transmission system 101 and the wireless power receiver client 103 over this data communication channel. For example, wireless power signaling can be time sliced among various clients in a wireless power delivery environment. In such cases, the wireless power transmission system 101 can send beacon schedule information, e.g., Beacon Beat Schedule (BBS) cycle, power cycle information, etc., so that the wireless power receiver client 103 knows when to transmit (broadcast) its beacon signals and when to listen for power, etc.

Continuing with the example of FIG. 2, the wireless power transmission system 101 selects one or more wireless power receiver clients for receiving power and sends the beacon schedule information to the select wireless power receiver clients 103. The wireless power transmission system 101 can also send power transmission scheduling information so that the wireless power receiver client 103 knows when to expect (e.g., a window of time) wireless power from the wireless power transmission system. The wireless power receiver client 103 then generates a beacon (or calibration) signal and broadcasts the beacon during an assigned beacon transmission window (or time slice) indicated by the beacon schedule information, e.g., BBS cycle. As discussed herein, the wireless power receiver client 103 includes one or more antennas (or transceivers) which have a radiation and reception pattern in three-dimensional space proximate to the wireless device 102 in which the wireless power receiver client 103 is embedded.

The wireless power transmission system 101 receives the beacon from the power receiver client 103 and detects and/or otherwise measures the phase (or direction) from which the beacon signal is received at multiple antennas. The wireless power transmission system 101 then delivers wireless power to the power receiver client 103 from the multiple antennas 103 based on the detected or measured phase (or direction) of the received beacon at each of the corresponding antennas. In some embodiments, the wireless power transmission system 101 determines the complex conjugate of the measured phase of the beacon and uses the complex conjugate to determine a transmit phase that configures the antennas for delivering and/or otherwise directing wireless power to the wireless power receiver client 103 via the same path over which the beacon signal was received from the wireless power receiver client 103.

In some embodiments, the wireless power transmission system 101 includes many antennas. One or more of the many antennas may be used to deliver power to the power receiver client 103. The wireless power transmission system 101 can detect and/or otherwise determine or measure phases at which the beacon signals are received at each antenna. The large number of antennas may result in different phases of the beacon signal being received at each antenna of the wireless power transmission system 101. As discussed above, the wireless power transmission system 101 can determine the complex conjugate of the beacon signals received at each antenna. Using the complex conjugates, one or more antennas may emit a signal that takes into account the effects of the large number of antennas in the wireless power transmission system 101. In other words, the wireless power transmission system 101 can emit a wireless power transmission signal from one or more antennas in such a way as to create an aggregate signal from the one or more of the antennas that approximately recreates the waveform of the beacon in the opposite direction. Said another way, the wireless power transmission system 101 can deliver wireless RF power to the wireless power receiver clients via the same paths over which the beacon signal is received at the wireless power transmission system 101. These paths can utilize reflective objects 106 within the environment. Additionally, the wireless power transmission signals can be simultaneously transmitted from the wireless power transmission system 101 such that the wireless power transmission signals collectively match the antenna radiation and reception pattern of the client device in a three-dimensional (3D) space proximate to the client device.

As shown, the beacon (or calibration) signals can be periodically transmitted by wireless power receiver clients 103 within the power delivery environment according to, for example, the BBS, so that the wireless power transmission system 101 can maintain knowledge and/or otherwise track the location of the power receiver clients 103 in the wireless power delivery environment. The process of receiving beacon signals from a wireless power receiver client 103 at the wireless power transmission system and, in turn, responding with wireless power directed to that particular wireless power receiver client is referred to herein as retrodirective wireless power delivery.

Furthermore, as discussed herein, wireless power can be delivered in power cycles defined by power schedule information. A more detailed example of the signaling required to commence wireless power delivery is described now with reference to FIG. 3.

Figure 3:
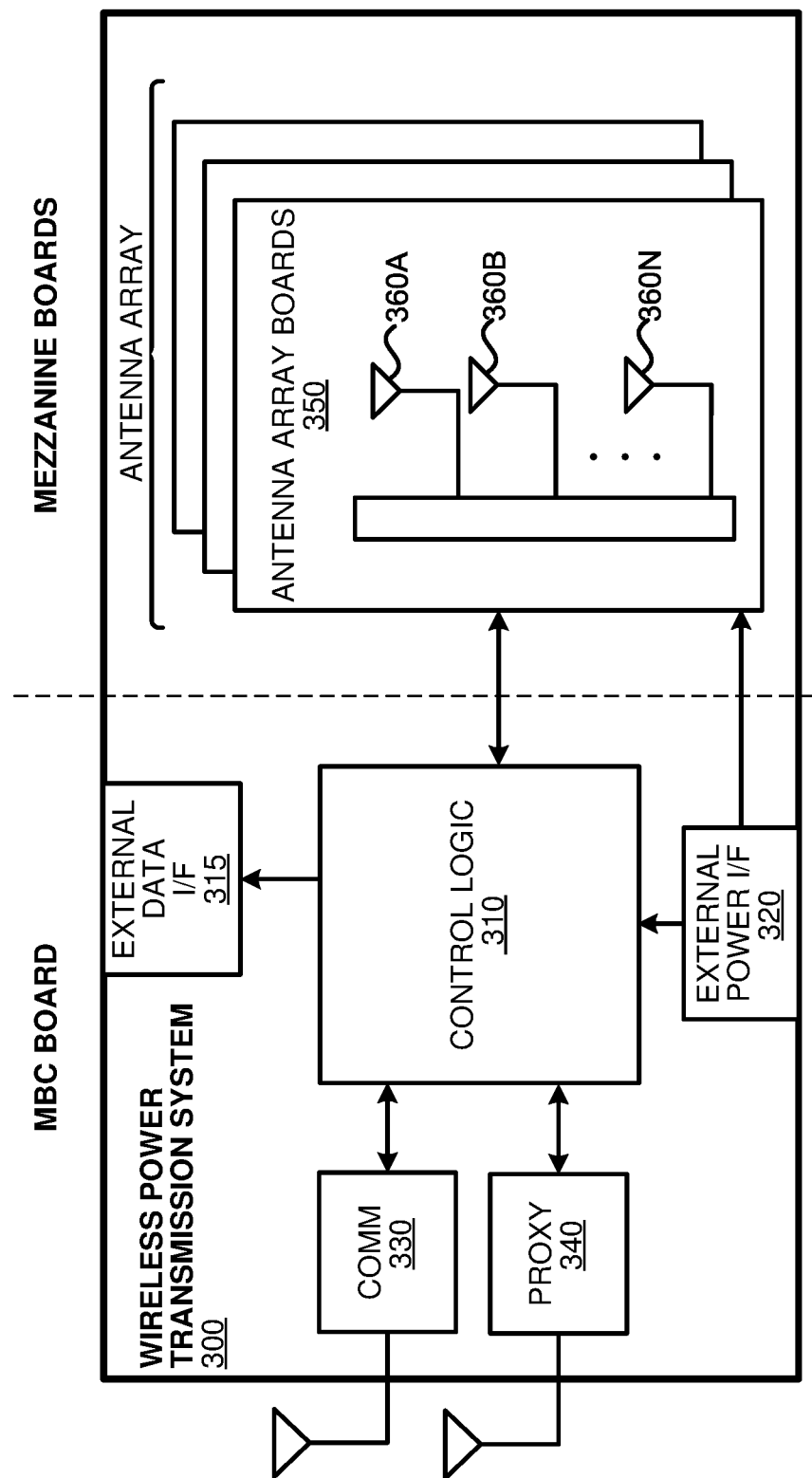
FIG. 3 depicts a block diagram illustrating example components of a wireless power transmission system in accordance with some embodiments.

FIG. 3 depicts a block diagram illustrating example components of a wireless power transmission system 300, in accordance with an embodiment. As illustrated in the example of FIG. 3, the wireless charger 300 includes a master bus controller (MBC) board and multiple mezzanine boards that collectively comprise the antenna array. The MBC includes control logic 310, an external data interface (I/F) 315, an external power interface (I/F) 320, a communication block 330 and proxy 340. The mezzanine (or antenna array boards 350) each include multiple antennas 360a-360n. Some or all of the components can be omitted in some embodiments. Additional components are also possible. For example, in some embodiments only one of communication block 330 or proxy 340 may be included.

The control logic 310 is configured to provide control and intelligence to the array components. The control logic 310 may comprise one or more processors, FPGAs, memory units, etc., and direct and control the various data and power communications. The communication block 330 can direct data communications on a data carrier frequency, such as the base signal clock for clock synchronization. The data communications can be Bluetooth™, Wi-Fi™, ZigBee™, etc., including combinations or variations thereof. Likewise, the proxy 340 can communicate with clients via data communications as discussed herein. The data communications can be, by way of example and not limitation, Bluetooth™, Wi-Fi™, ZigBee™, etc. Other communication protocols are possible.

In some embodiments, the control logic 310 can also facilitate and/or otherwise enable data aggregation for Internet of Things (IoT) devices. In some embodiments, wireless power receiver clients can access, track and/or otherwise obtain IoT information about the device in which the wireless power receiver client is embedded and provide that IoT information to the wireless power transmission system 300 over a data connection. This IoT information can be provided to via an external data interface 315 to a central or cloud-based system (not shown) where the data can be aggregated, processed, etc. For example, the central system can process the data to identify various trends across geographies, wireless power transmission systems, environments, devices, etc. In some embodiments, the aggregated data and or the trend data can be used to improve operation of the devices via remote updates, etc. Alternatively, or additionally, in some embodiments, the aggregated data can be provided to third party data consumers. In this manner, the wireless power transmission system acts as a Gateway or Enabler for the IoT devices. By way of example and not limitation, the IoT information can include capabilities of the device in which the wireless power receiver client is embedded, usage information of the device, power levels of the device, information obtained by the device or the wireless power receiver client itself, e.g., via sensors, etc.

The external power interface 320 is configured to receive external power and provide the power to various components. In some embodiments, the external power interface 320 may be configured to receive a standard external 24 Volt power supply. In other embodiments, the external power interface 320 can be, for example, 120/240 Volt AC mains to an embedded DC power supply which sources the required 12/24/48 Volt DC to provide the power to various components. Alternatively, the external power interface could be a DC supply which sources the required 12/24/48 Volts DC. Alternative configurations are also possible.

In operation, the MBC, which controls the wireless power transmission system 300, receives power from a power source and is activated. The MBC then activates the proxy antenna elements on the wireless power transmission system and the proxy antenna elements enter a default "discovery" mode to identify available wireless receiver clients within range of the wireless power transmission system. When a client is found, the antenna elements on the wireless power transmission system power on, enumerate, and (optionally) calibrate.

The MBC then generates beacon transmission scheduling information and power transmission scheduling information during a scheduling process. The scheduling process includes selection of power receiver clients. For example, the MBC can select power receiver clients for power transmission and generate a BBS cycle and a Power Schedule (PS) for the selected wireless power receiver clients. As discussed herein, the power receiver clients can be selected based on their corresponding properties and/or requirements.

In some embodiments, the MBC can also identify and/or otherwise select available clients that will have their status queried in the Client Query Table (CQT). Clients that are placed in the CQT are those on "standby", e.g., not receiving a charge. The BBS and PS are calculated based on vital information about the clients such as, for example, battery status, current activity/usage, how much longer the client has until it runs out of power, priority in terms of usage, etc.

The Proxy Antenna Element (AE) broadcasts the BBS to all clients. As discussed herein, the BBS indicates when each client should send a beacon. Likewise, the PS indicates when and to which clients the array should send power to and when clients should listen for wireless power. Each client starts broadcasting its beacon and receiving power from the array per the BBS and PS. The Proxy AE can concurrently query the Client Query Table to check the status of other available clients. In some embodiments, a client can only exist in the BBS or the CQT (e.g., waitlist), but not in both. The information collected in the previous step continuously and/or periodically updates the BBS cycle and/or the PS.

Figure 4:
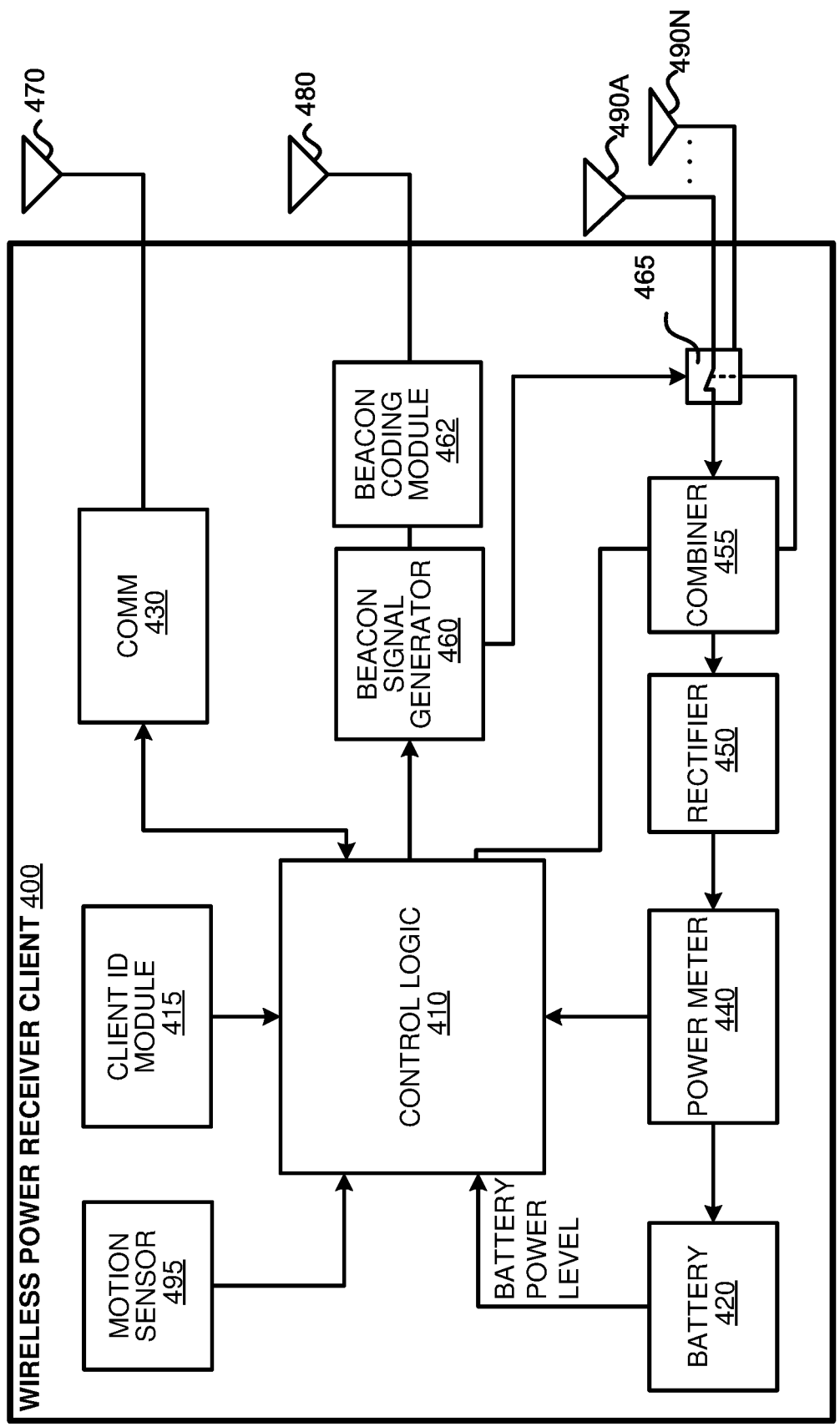
FIG. 4 depicts a block diagram illustrating example components of a wireless power receiver client in accordance with some embodiments.

FIG. 4 is a block diagram illustrating example components of a wireless power receiver client 400, in accordance with some embodiments. As illustrated in the example of FIG. 4, the receiver 400 includes control logic 410, battery 420, an IoT control module 425, communication block 430 and associated antenna 470, power meter 440, rectifier 450, a combiner 455, beacon signal generator 460, beacon coding unit 462 and an associated antenna 480, and switch 465 connecting the rectifier 450 or the beacon signal generator 460 to one or more associated antennas 490a-n. Some or all of the components can be omitted in some embodiments. For example, in some embodiments, the wireless power receiver client 400 does not include its own antennas but instead utilizes and/or otherwise shares one or more antennas (e.g., Wi-Fi antenna) of the wireless device in which the wireless power receiver client is embedded. Moreover, in some embodiments, the wireless power receiver client may include a single antenna that provides data transmission functionality as well as power/data reception functionality. Additional components are also possible.

A combiner 455 receives and combines the received power transmission signals from the power transmitter in the event that the receiver 400 has more than one antenna. The combiner can be any combiner or divider circuit that is configured to achieve isolation between the output ports while maintaining a matched condition. For example, the combiner 455 can be a Wilkinson Power Divider circuit. The rectifier 450 receives the combined power transmission signal from the combiner 455, if present, which is fed through the power meter 440 to the battery 420 for charging. In other embodiments, each antenna's power path can have its own rectifier 450 and the DC power out of the rectifiers is combined prior to feeding the power meter 440. The power meter 440 can measure the received power signal strength and provides the control logic 410 with this measurement.

Battery 420 can include protection circuitry and/or monitoring functions. Additionally, the battery 420 can include one or more features, including, but not limited to, current limiting, temperature protection, over/under voltage alerts and protection, and coulomb monitoring.

The control logic 410 receives and processes the battery power level from the battery 420 itself. The control logic 410 may also transmit/receive via the communication block 430 a data signal on a data carrier frequency, such as the base signal clock for clock synchronization. The beacon signal generator 460 generates the beacon signal, or calibration signal, transmits the beacon signal using either the antenna 480 or 490 after the beacon signal is encoded.

It may be noted that, although the battery 420 is shown as charged by, and providing power to, the wireless power receiver client 400, the receiver may also receive its power directly from the rectifier 450. This may be in addition to the rectifier 450 providing charging current to the battery 420, or in lieu of providing charging. Also, it may be noted that the use of multiple antennas is one example of implementation and the structure may be reduced to one shared antenna.

In some embodiments, the control logic 410 and/or the IoT control module 425 can communicate with and/or otherwise derive IoT information from the device in which the wireless power receiver client 400 is embedded. Although not shown, in some embodiments, the wireless power receiver client 400 can have one or more data connections (wired or wireless) with the device in which the wireless power receiver client 400 is embedded over which IoT information can be obtained. Alternatively, or additionally, IoT information can be determined and/or inferred by the wireless power receiver client 400, e.g., via one or more sensors. As discussed above, the IoT information can include, but is not limited to, information about the capabilities of the device in which the wireless power receiver client 400 is embedded, usage information of the device in which the wireless power receiver client 400 is embedded, power levels of the battery or batteries of the device in which the wireless power receiver client 400 is embedded, and/or information obtained or inferred by the device in which the wireless power receiver client is embedded or the wireless power receiver client itself, e.g., via sensors, etc.

In some embodiments, a client identifier (ID) module 415 stores a client ID that can uniquely identify the wireless power receiver client 400 in a wireless power delivery environment. For example, the ID can be transmitted to one or more wireless power transmission systems when communication is established. In some embodiments, wireless power receiver clients may also be able to receive and identify other wireless power receiver clients in a wireless power delivery environment based on the client ID.

An optional motion sensor 495 can detect motion and signal the control logic 410 to act accordingly. For example, a device receiving power may integrate motion detection mechanisms such as accelerometers or equivalent mechanisms to detect motion. Once the device detects that it is in motion, it may be assumed that it is being handled by a user, and would trigger a signal to the array to either to stop transmitting power, or to lower the power transmitted to the device. In some embodiments, when a device is used in a moving environment like a car, train or plane, the power might only be transmitted intermittently or at a reduced level unless the device is critically low on power.

Figure 5A:
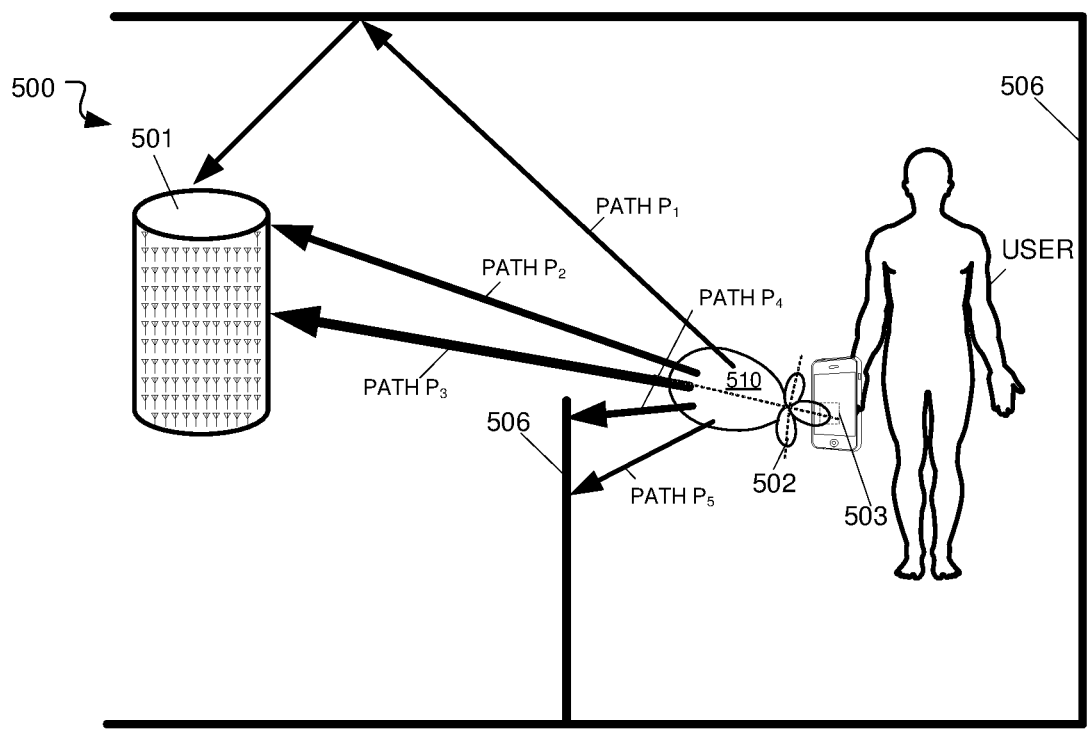
FIGS. 5A and 5B depict diagrams illustrating an example multipath wireless power delivery environment in accordance with some embodiments.
Figure 5B:
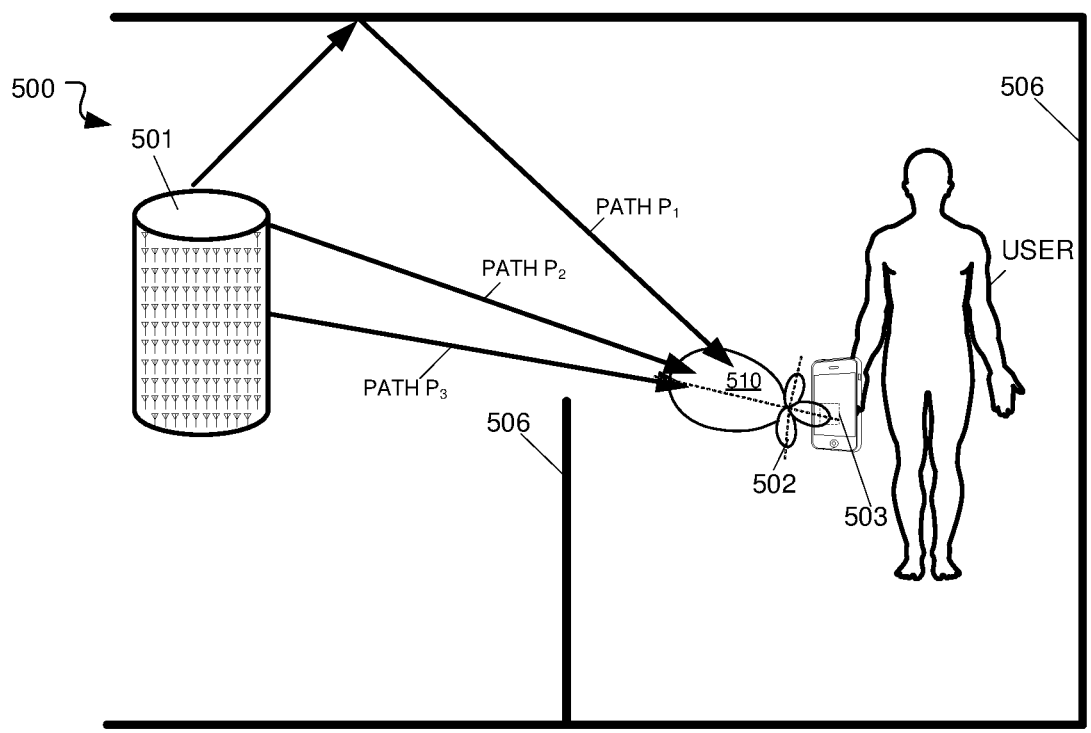

FIGS. 5A and 5B depict diagrams illustrating an example multipath wireless power delivery environment 500, according to some embodiments. The multipath wireless power delivery environment 500 includes a user operating a wireless device 502 including one or more wireless power receiver clients 503. The wireless device 502 and the one or more wireless power receiver clients 503 can be wireless device 102 of FIG. 1 and wireless power receiver client 103 of FIG. 1 or wireless power receiver client 400 of FIG. 4, respectively, although alternative configurations are possible. Likewise, wireless power transmission system 501 can be wireless power transmission system 101 of FIG. 1 or wireless power transmission system 300 of FIG. 3, although alternative configurations are possible. The multipath wireless power delivery environment 500 includes reflective objects 506 and various absorptive objects, e.g., users, or humans, furniture, etc.

Wireless device 502 includes one or more antennas (or transceivers) that have a radiation and reception pattern 510 in three-dimensional space proximate to the wireless device 502. The one or more antennas (or transceivers) can be wholly or partially included as part of the wireless device 502 and/or the wireless power receiver client (not shown). For example, in some embodiments one or more antennas, e.g., Wi-Fi, Bluetooth, etc. of the wireless device 502 can be utilized and/or otherwise shared for wireless power reception. As shown in the example of FIGS. 5A and 5B, the radiation and reception pattern 510 comprises a lobe pattern with a primary lobe and multiple side lobes. Other patterns are also possible.

The wireless device 502 transmits a beacon (or calibration) signal over multiple paths to the wireless power transmission system 501. As discussed herein, the wireless device 502 transmits the beacon in the direction of the radiation and reception pattern 510 such that the strength of the received beacon signal by the wireless power transmission system, e.g., received signal strength indication (RSSI), depends on the radiation and reception pattern 510. For example, beacon signals are not transmitted where there are nulls in the radiation and reception pattern 510 and beacon signals are the strongest at the peaks in the radiation and reception pattern 510, e.g., peak of the primary lobe. As shown in the example of FIG. 5A, the wireless device 502 transmits beacon signals over five paths P1-P5. Paths P4 and P5 are blocked by reflective and/or absorptive object 506. The wireless power transmission system 501 receives beacon signals of increasing strengths via paths P1-P3. The bolder lines indicate stronger signals. In some embodiments, the beacon signals are directionally transmitted in this manner, for example, to avoid unnecessary RF energy exposure to the user.

A fundamental property of antennas is that the receiving pattern (sensitivity as a function of direction) of an antenna when used for receiving is identical to the far-field radiation pattern of the antenna when used for transmitting. This is a consequence of the reciprocity theorem in electromagnetism. As shown in the example of FIGS. 5A and 5B, the radiation and reception pattern 510 is a three-dimensional lobe shape. However, the radiation and reception pattern 510 can be any number of shapes depending on the type or types, e.g., horn antennas, simple vertical antenna, etc. used in the antenna design. For example, the radiation and reception pattern 510 can comprise various directive patterns. Any number of different antenna radiation and reception patterns are possible for each of multiple client devices in a wireless power delivery environment.

Referring again to FIG. 5A, the wireless power transmission system 501 receives the beacon (or calibration) signal via multiple paths P1-P3 at multiple antennas or transceivers. As shown, paths P2 and P3 are direct line of sight paths while path P1 is a non-line of sight path. Once the beacon (or calibration) signal is received by the wireless power transmission system 501, the power transmission system 501 processes the beacon (or calibration) signal to determine one or more receive characteristics of the beacon signal at each of the multiple antennas. For example, among other operations, the wireless power transmission system 501 can measure the phases at which the beacon signal is received at each of the multiple antennas or transceivers.

The wireless power transmission system 501 processes the one or more receive characteristics of the beacon signal at each of the multiple antennas to determine or measure one or more wireless power transmit characteristics for each of the multiple RF transceivers based on the one or more receive characteristics of the beacon (or calibration) signal as measured at the corresponding antenna or transceiver. By way of example and not limitation, the wireless power transmit characteristics can include phase settings for each antenna or transceiver, transmission power settings, etc.

As discussed herein, the wireless power transmission system 501 determines the wireless power transmit characteristics such that, once the antennas or transceivers are configured, the multiple antennas or transceivers are operable to transmit a wireless power signal that matches the client radiation and reception pattern in the three-dimensional space proximate to the client device. FIG. 5B illustrates the wireless power transmission system 501 transmitting wireless power via paths P1-P3 to the wireless device 502. Advantageously, as discussed herein, the wireless power signal matches the client radiation and reception pattern 510 in the three-dimensional space proximate to the client device. Said another way, the wireless power transmission system will transmit the wireless power signals in the direction in which the wireless power receiver has maximum gain, e.g., will receive the most wireless power. As a result, no signals are sent in directions in which the wireless power receiver cannot receive power, e.g., nulls and blockages. In some embodiments, the wireless power transmission system 501 measures the RSSI of the received beacon signal and if the beacon is less than a threshold value, the wireless power transmission system will not send wireless power over that path.

The three paths shown in the example of FIGS. 5A and 5B are illustrated for simplicity, it is appreciated that any number of paths can be utilized for transmitting power to the wireless device 502 depending on, among other factors, reflective and absorptive objects in the wireless power delivery environment. Although the example of FIG. 5A illustrates transmitting a beacon (or calibration) signal in the direction of the radiation and reception pattern 510, it is appreciated that, in some embodiments, beacon signals can alternatively or additionally be omni-directionally transmitted.

Figure 6:
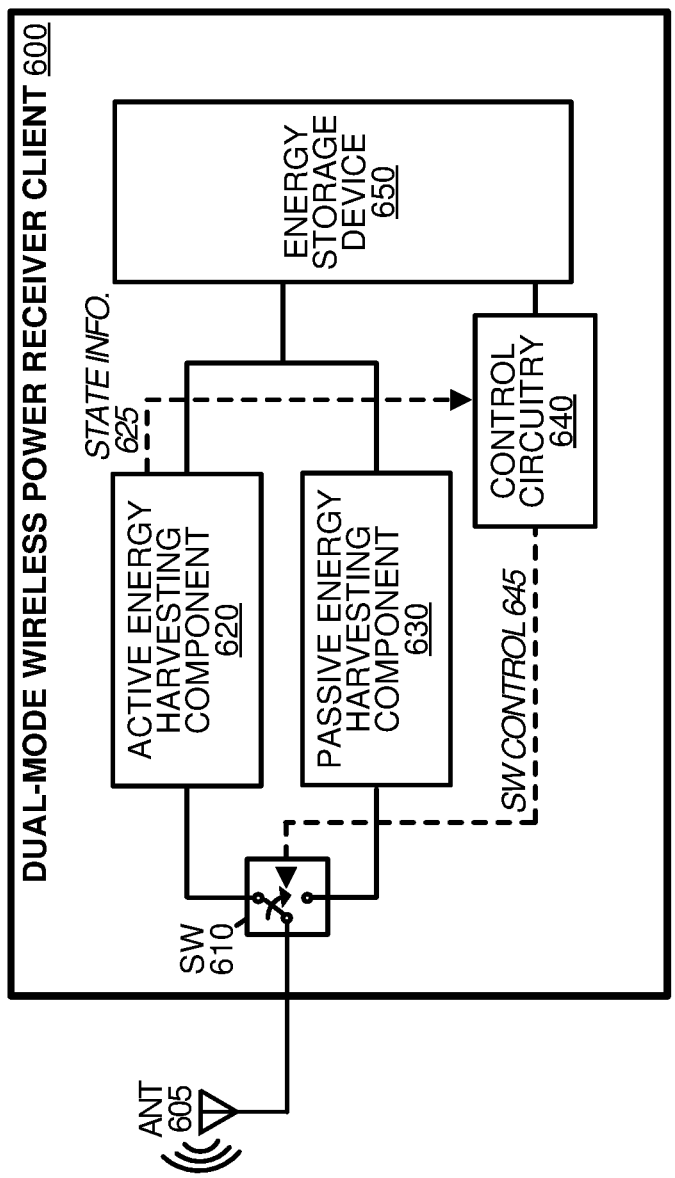
FIG. 6 depicts a block diagram illustrating example components of a dual-mode wireless power receiver client, according to some embodiments.

FIG. 6 depicts a block diagram illustrating example components of a dual-mode wireless power receiver client, according to some embodiments. More specifically, the dual-mode wireless power receiver client 600 is adapted to use passive energy-harvesting techniques in parallel with active energy-harvesting techniques. In some embodiments, the dual-mode wireless power receiver client 600 can switch to a low-power (or passive) energy-harvesting mode when it is not using the antenna 605, e.g., not receiving Cota® RF power or sending or receiving communications. As shown in the example of FIG. 6, the dual-mode wireless power receiver client 600 includes antenna 605, switch 610, an active energy harvesting component 620, a passive energy harvesting component 630, control circuitry 640, and an energy storage unit (or battery) 650. Additional of fewer components are possible.

The active energy harvesting component 620 is adapted to receive directed (or isolated) RF energy from a wireless power transmission system, convert the RF energy to direct current (DC) power, and store the DC power in the energy storage device 650. In some embodiments, the active energy harvesting component 620 includes some or all of the components of (or may be) a discrete wireless power receiver client such as, for example, wireless power receiver client 400 of FIG. 4. In operation, the active energy harvesting component 620 directs the antenna 605 to establish a connection with a wireless power transmission system. Once the connection is established and communications commenced, the active energy harvesting component 620 transmits a beacon signal to the wireless power transmission system and, responsive to the beacon signal, receives directed or isolated wireless power from the wireless power transmission system via one or more paths. The received wireless power is processed, e.g., RF power is converted to DC, and stored in the energy storage device 650.

The passive energy harvesting component 630 is adapted to harvest passive RF energy, convert the energy to DC power, and store the DC power in the energy storage device 650. As discussed herein, the passive energy harvesting component 630 harvests ambient RF energy (e.g., Wi-Fi, cellular, etc.) to trickle charge the energy storage device 650 with minimal or no power usage.

The control (or switching) circuitry 640 monitors and controls switch 610 via a switch control line 645 to enable the active energy harvesting component 620 or the passive harvesting component 620. In some embodiments, the active energy harvesting component provides state information 625 that can be used by the control circuitry 640. The state information 625 can include, but is not limited to, information about when the active energy harvesting component 620 is active (e.g., transmitting or receiving) or idle. In some embodiments, the control circuitry 640 uses this information and/or information regarding the state of the energy storage device 650 (e.g., current power level, charge rate, etc.) to determine a state of the dual-mode wireless power receiver client 600 and/or a corresponding harvest mode. Examples describing the various states and/or modes enabled in those states are shown and discussed in greater detail with reference to FIGS. 7A and 7B.

The energy storage device 650 can be any device or group of devices or modules capable of storing energy. For example, the energy storage device 650 can include one or more batteries, capacitors, etc. In some embodiments, the energy storage device 650 can include an internal power monitor or other tracking circuitry. Alternatively or additionally, the control circuitry 640 may perform some or all of these functions.

Figure 7A:
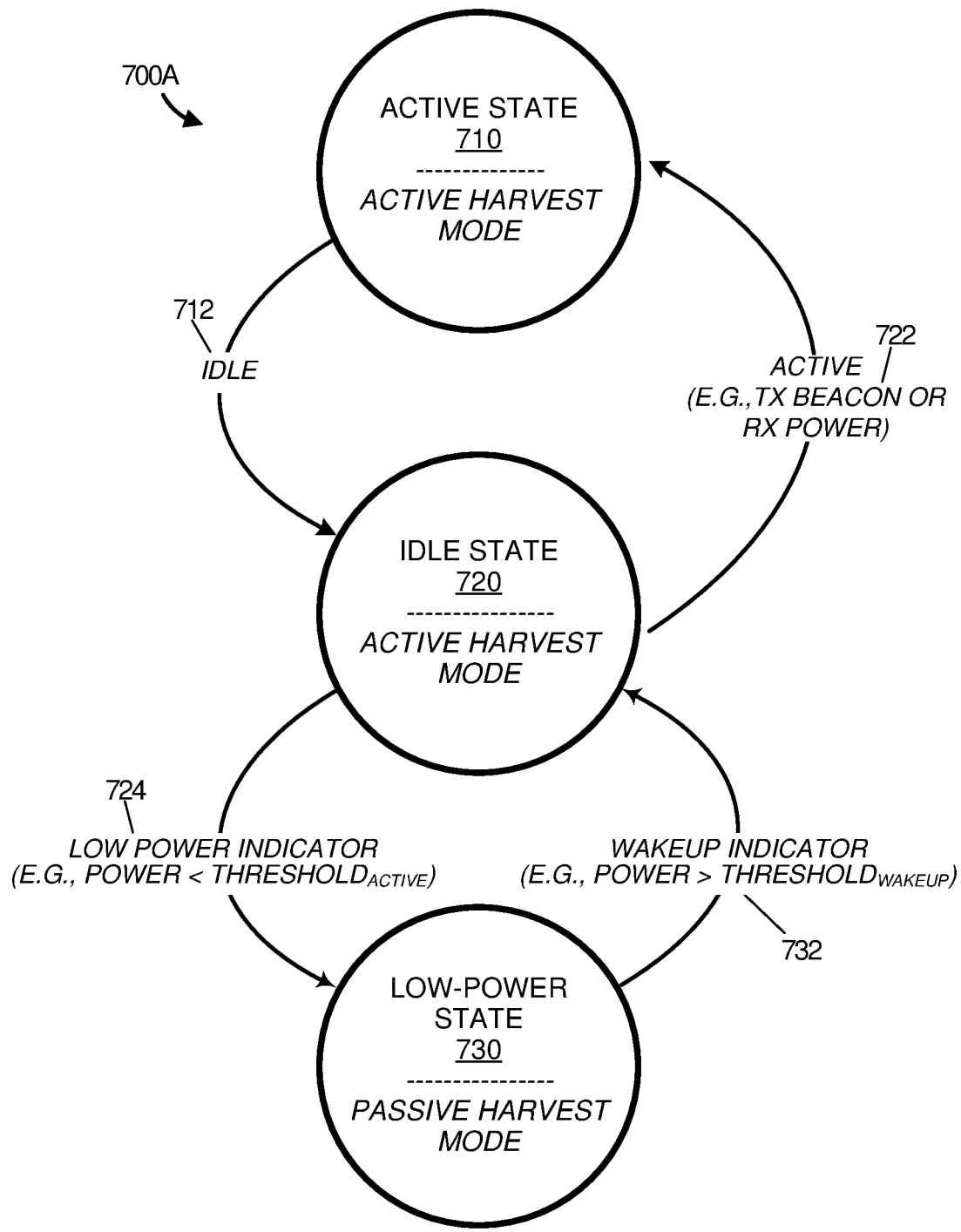
FIGS. 7A and 7B depict state diagrams illustrating example states and transition conditions of a dual-mode wireless power receiver client, according to some embodiments.
Figure 7B:
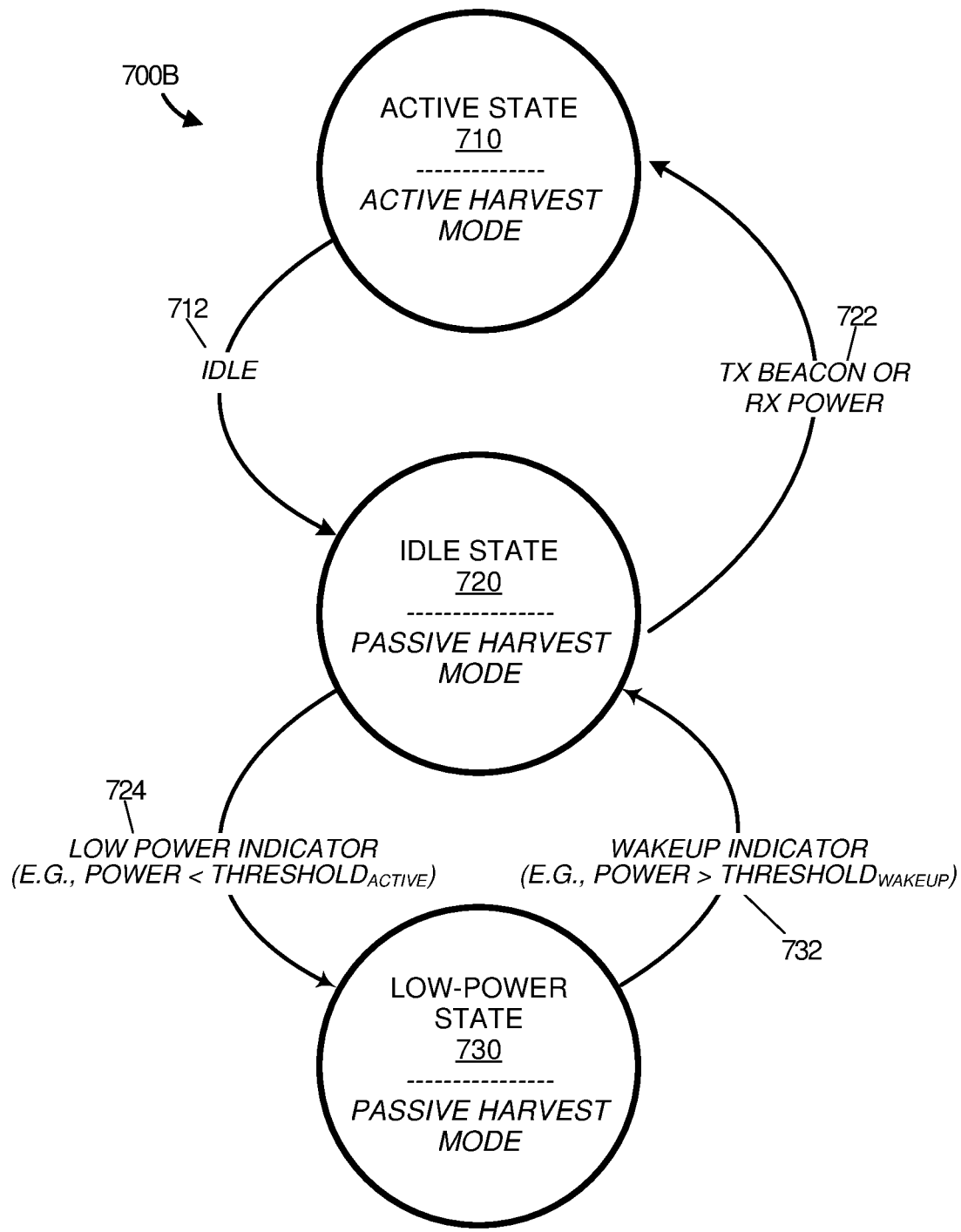

FIGS. 7A and 7B depict state diagrams 700A and 700B, respectively, illustrating example states and transition conditions of a dual-mode wireless power receiver client, according to some embodiments. The dual-mode wireless power receiver client may be dual-mode wireless power receiver client 600 of FIG. 6, although alternative configurations are possible.

Referring first to the example of FIG. 7A, in an 'active state' 710 the dual-mode wireless power receiver client is in an active harvest mode. In the active harvest mode, the dual-mode wireless power receiver client communicates with a wireless power transmission system by sending beacon signals and responsively receiving directed wireless RF power (as discussed herein). The dual-mode wireless power receiver client transitions from the 'active state' 710 to the 'idle state' 720 when an idle condition 712 is detected. In some embodiments, the idle condition 712 can be an indication that the active energy harvesting component 620 is currently idle (e.g., not transmitting beacons or receiving directed wireless power from the wireless power transmission system).

As shown in the example of FIG. 7A, in the 'idle state' 720, the dual-mode wireless power receiver client remains in the active harvest mode. However, in some embodiments, and as shown in the example of FIG. 7B, the dual-mode wireless power receiver client can enter a passive harvest mode in 'idle state' 720. In response to an active condition 712 (e.g., imminent transmission or reception), the dual-mode wireless power receiver client returns to the 'active' state 710. In response to a low power indicator condition 724, the dual-mode wireless power receiver client transitions to a 'low-power' state 730.

In the 'low power' state 730, the dual-mode wireless power receiver client transitions to an ultra-low power passive harvest mode. In some embodiments, during the passive harvest mode, the dual-mode wireless power receiver client disables the active energy harvesting component and enables the passive energy harvesting component. The dual-mode wireless power receiver client can monitor a power level during the 'low power' state. After a predetermined amount of energy, e.g., wake-up threshold, is harvested, a wake-up indicator 732 can transition the dual-mode wireless power receiver client from the 'low power' state 730 back to an 'idle' state 720.

The wireless power receiver client attempts to wake-up and establish communications with or join a wireless power network. If sufficient power is received from a wireless power transmission system for maintaining an active (or an awake state e.g., 'active' state 710 and/or 'idle' state 720), then the wireless power receiver client can continue normal operation. Otherwise, the wireless power receiver client returns to the 'low-power' state 730 and continues to harvest ambient RF energy in a passive harvest mode. In some embodiments, the wake-up threshold may be adjusted responsive to one or more successive failed wake-up attempts. For example, the threshold value may be dynamically increased or incremented, e.g., a back-off timer, to reduce interference in areas with several RF devices or to ensure sufficient energy is stored for a longer wake-up attempt.

Figure 8:
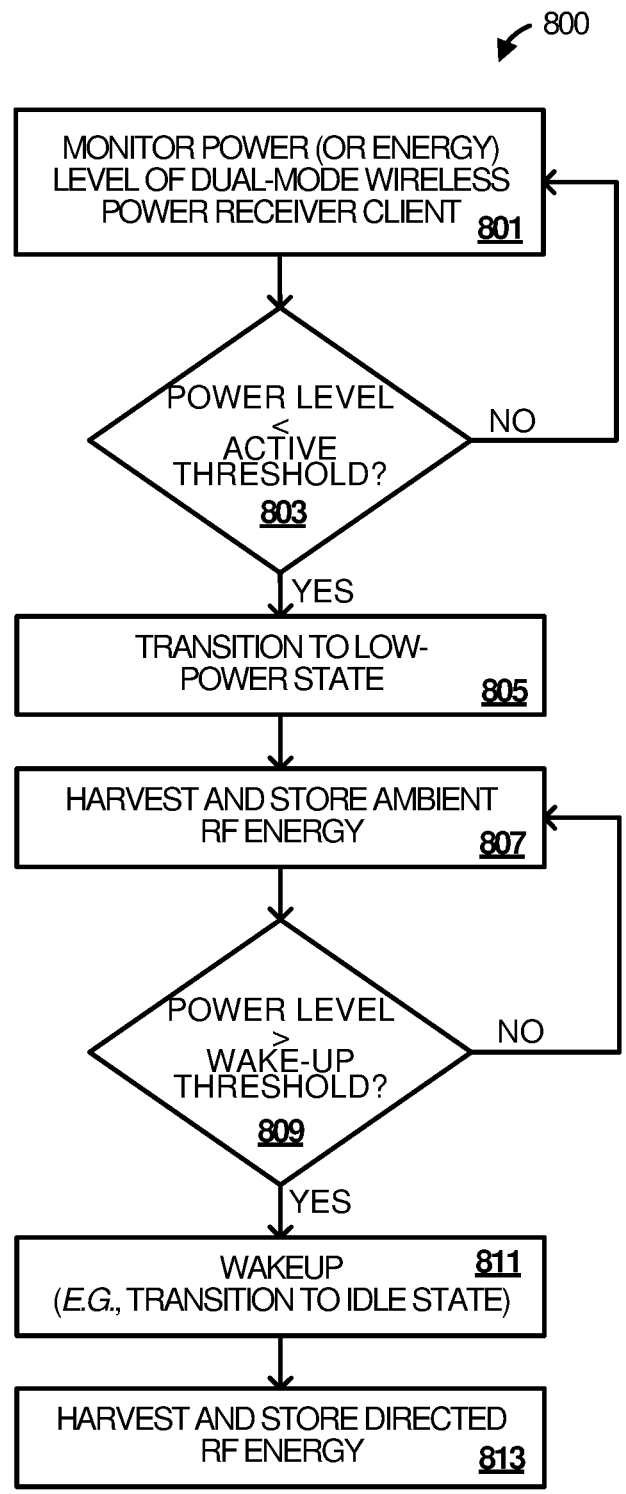
FIG. 8 depicts a flow diagram illustrating an example process for passively harvesting energy to wake-up a dual-mode wireless power receiver client, according to some embodiments.

FIG. 8 depicts a flow diagram illustrating an example process 800 for passively harvesting energy to wake-up a dual-mode wireless power receiver client, according to some embodiments. A dual-mode wireless power receiver client can, among other functions, perform the corresponding steps of example process 800. The dual-mode wireless power receiver client can be dual-mode wireless power receiver client 600 of FIG. 6, although alternative configurations are possible.

To begin, at step 801, the dual-mode wireless power receiver client monitors a power (or energy) level of a dual-mode wireless power receiver client, e.g., of an energy storage device. A decision step 803, the dual-mode wireless power receiver client determines if a power level of an energy storage device of the dual-mode wireless power receiver client is less than an active power threshold value. If not, the monitoring continues at step 801. Otherwise, at step 805, the dual-mode wireless power receiver client transitions to a 'low-power' state and, at step 807, harvest and stores ambient RF energy.

At decision 809, the dual-mode wireless power receiver client determines if the power level of the energy storage device exceeds a wake-up power threshold. If not, the dual-mode wireless power receiver client continues harvesting ambient RF energy. Otherwise, at step 811, the dual-mode wireless power receiver client, responsive to the power level of the energy storage device exceeding a wake-up power threshold, attempts to wake-up from the low-power state and, lastly, at step 813, harvests and stores directed RF energy as discussed herein.

Figure 9:
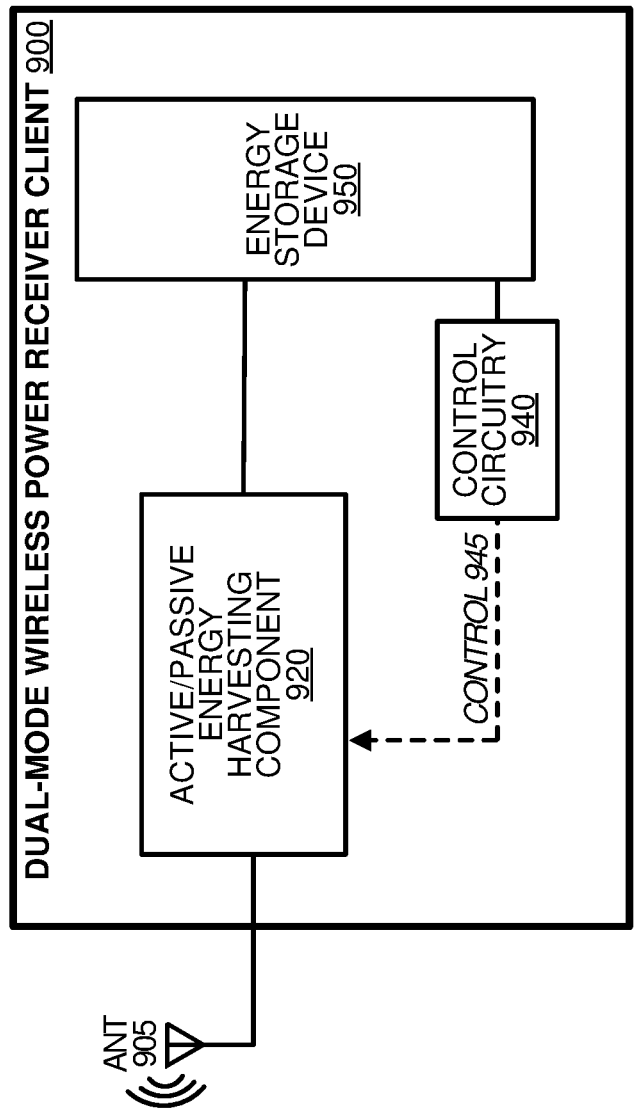
FIG. 9 depicts a block diagram illustrating example components of a dual-mode wireless power receiver client, according to some embodiments.

FIG. 9 depicts a block diagram illustrating example components of a dual-mode wireless power receiver client 900, according to some embodiments. More specifically, the dual-mode wireless power receiver client 900 is adapted to utilize a combined passive/active energy-harvesting technique, e.g., a discrete circuit capable of handling both passive energy harvesting and active energy harvesting. As shown in the example of FIG. 9, the dual-mode wireless power receiver client 900 includes an active/passive energy harvesting component 920, control circuitry 940, and an energy storage device 950. Antenna 905 may also be a component of the dual-mode wireless power receiver client 900.

As noted above, the dual-mode wireless power receiver client 900 includes combined passive/active energy harvesting techniques. Advantageously, combined circuitry (e.g., reused rectifier circuitry) as shown and discussed in FIGS. 10 and 11 can reduce the overall footprint of the device (or circuitry) but can be more complex. The dual-mode wireless power receiver clients 1000 and 1100 of FIGS. 10 and 11, respectively, show and discuss various example designs in greater detail below.

Figure 10A:
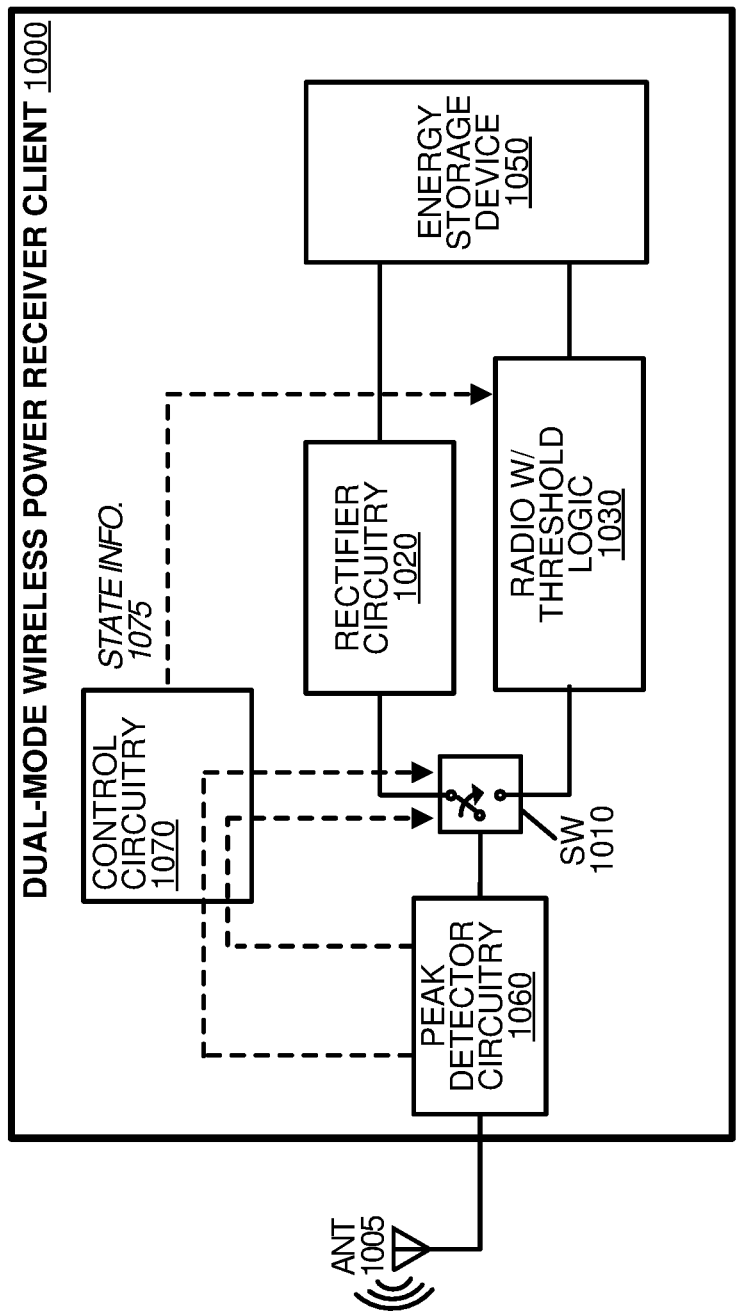
FIG. 10A depicts a block diagram illustrating example components of a dual-mode wireless power receiver client, according to some embodiments.

FIG. 10A depicts a block diagram illustrating example components of a dual-mode wireless power receiver client 1000, according to some embodiments. As shown in the example of FIG. 10A, the dual-mode wireless power receiver client 1000 includes peak detector circuitry 1060, control circuitry 1070, switch 1010, rectifier circuitry 1020, radio (with threshold logic) 1030, and energy storage device 1050. Antenna 1005 may also be a component of the dual-mode wireless power receiver client 1000.

The example of FIG. 10A is similar to the example of FIG. 9 but includes peak detector circuitry 1060 operable to detect presence of a radio frequency (RF) field and bias a switch 1010 (e.g., RF switch) to connect to rectifier circuitry 1020 when RF input power (from a wireless power transmission system) is coming into the antenna 1005. Additionally, the rectifier circuitry 1020 protects the radio 1030 when high RF input power is incoming by ensuring that the voltages that the radio is exposed to stay within a safe range.

Figure 10B:
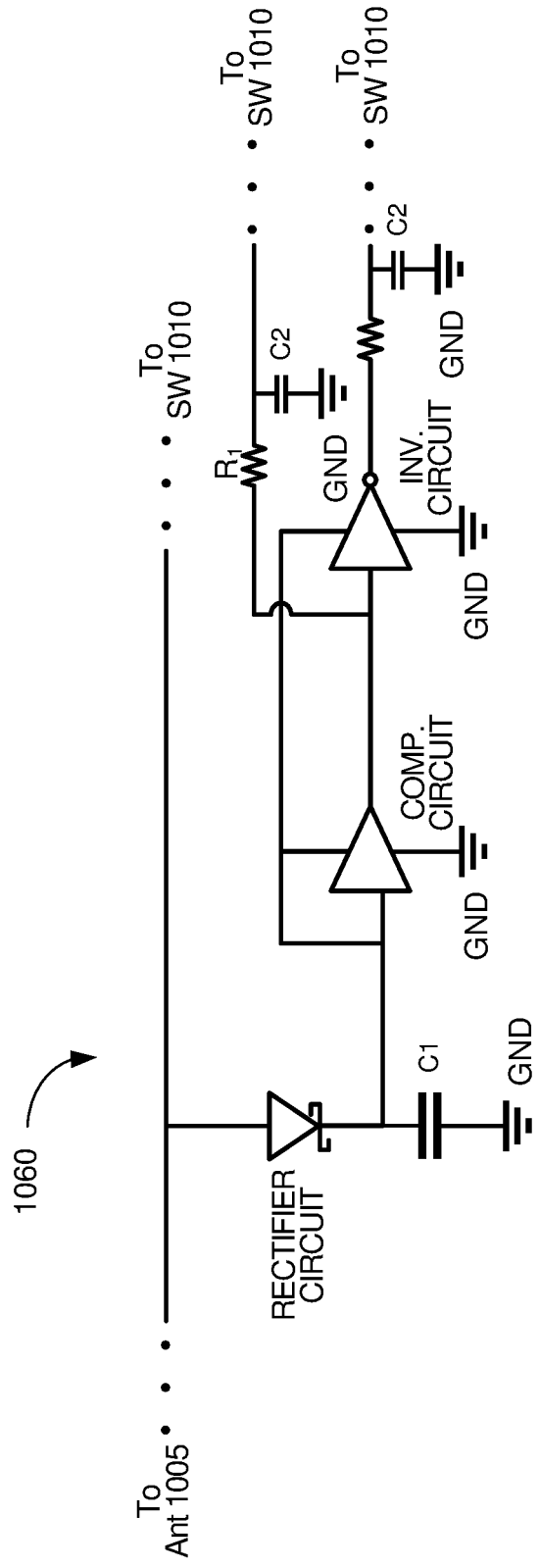
FIG. 10B depicts a block diagram illustrating example components of peak detector circuitry, according to some embodiments.

FIG. 10B depicts a block diagram illustrating example components of peak detector circuitry 1060 of FIG. 10A, according to some embodiments. As shown in the example of FIG. 10B, in some embodiments, the rectifier circuit can be a multi-stage rectifier to increase sensitivity, and the comparator circuit compares with an internal voltage reference. Additional or fewer components are possible.

Figure 11:
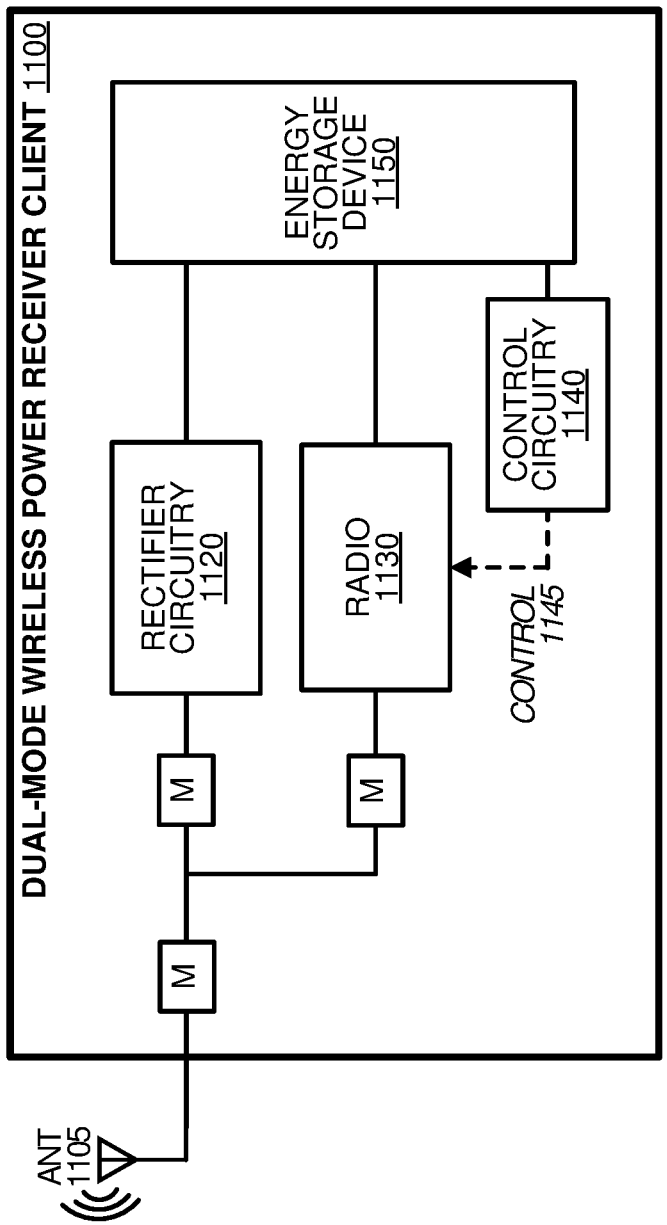
FIG. 11 depicts a block diagram illustrating example components of a dual-mode wireless power receiver client, according to some embodiments.

FIG. 11 depicts a block diagram illustrating example components of a dual-mode wireless power receiver client 1100, according to some embodiments. As shown in the example of FIG. 11, the dual-mode wireless power receiver client 1100 illustrates an example where the rectifier circuitry 1120 can be directly connected to radio 1130. Control circuitry 1040 operates to control the radio and the rectifier circuitry via control 1145 and energy storage device 1050 stores the DC power. Antenna 1105 may also be a component of the dual-mode wireless power receiver client 1100.

As noted above, in the example of FIG. 11, the rectifier circuitry 1120 can be connected directly to the radio 1130. The rectifier circuitry 1120 protects the radio 1130 when high RF input power is incoming by ensuring that the voltages that the radio is exposed to stay within a safe range (not significantly below 0V or greater than Vcc). Vcc can vary depending on the stored energy state. When the radio is active, the rectifier circuitry's 1120 impedance can be increased by opening a switch in series with one or more diode elements, and/or connecting a relatively high voltage to the output of the rectifier to increase the input voltage needed for conduction to a level higher than the radio amplifier sources. This will ensure that the diode operates in a linear range while the radio is active, reducing distortion on the received or transmitted RF signal. The matching components M can provide fixed or tunable matching. Advantageously, this design utilizes fewer components to accomplish the dual-mode wireless power receiver client.

Figure 12:
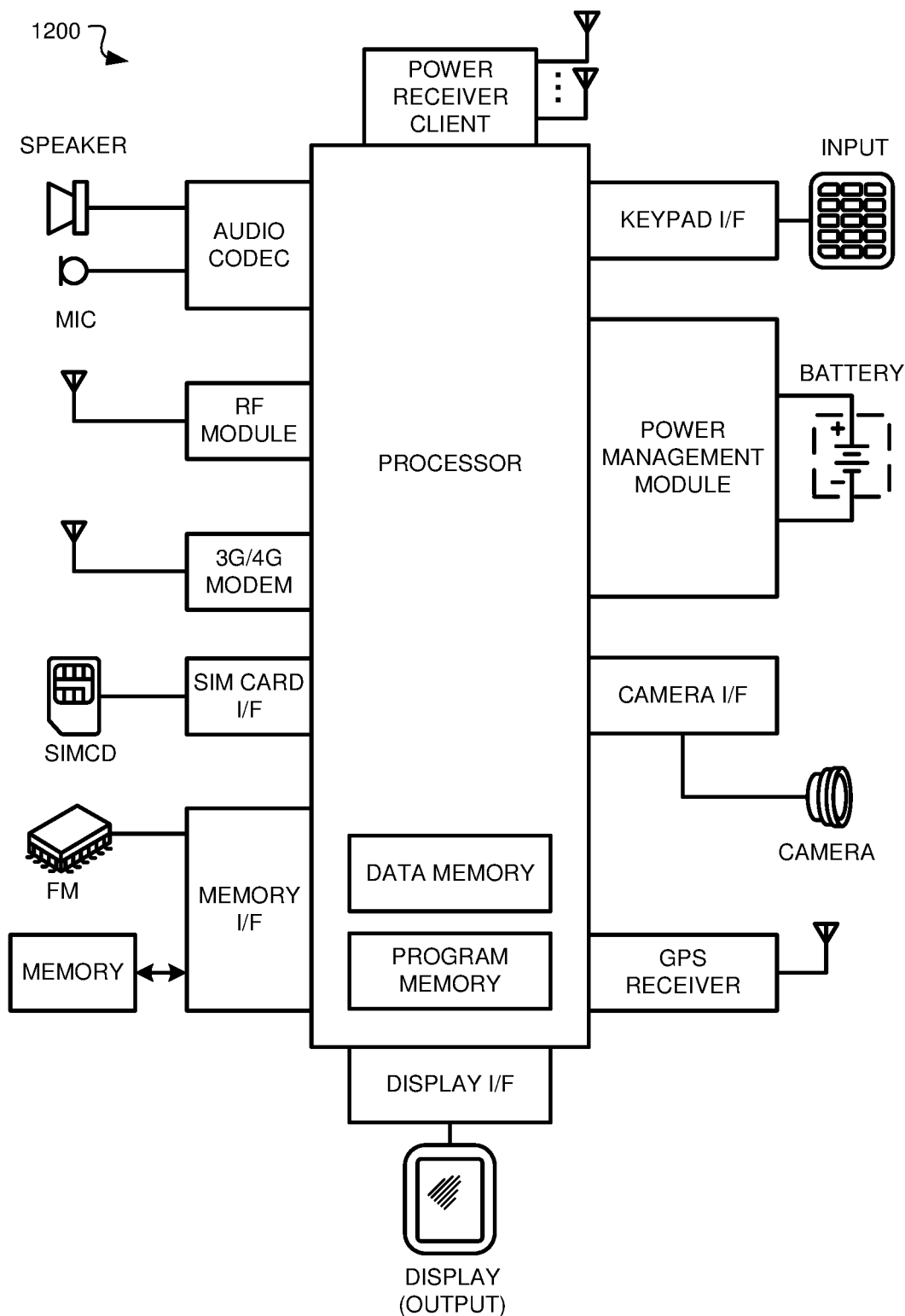
FIG. 12 depicts a block diagram illustrating example components of a representative mobile device or tablet computer with a wireless power receiver or client in the form of a mobile (or smart) phone or tablet computer device, according to some embodiments.

FIG. 12 depicts a block diagram illustrating example components of a representative mobile device or tablet computer 1200 with a wireless power receiver or client in the form of a mobile (or smart) phone or tablet computer device, according to an embodiment. Various interfaces and modules are shown with reference to FIG. 12, however, the mobile device or tablet computer does not require all of modules or functions for performing the functionality described herein. It is appreciated that, in many embodiments, various components are not included and/or necessary for operation of the category controller. For example, components such as GPS radios, cellular radios, and accelerometers may not be included in the controllers to reduce costs and/or complexity. Additionally, components such as ZigBee radios and RFID transceivers, along with antennas, can populate the Printed Circuit Board.

The wireless power receiver client can be a power receiver client 103 of FIG. 1, although alternative configurations are possible. Additionally, the wireless power receiver client can include one or more RF antennas for reception of power and/or data signals from a charger, e.g., charger 101 of FIG. 1.

Figure 13:
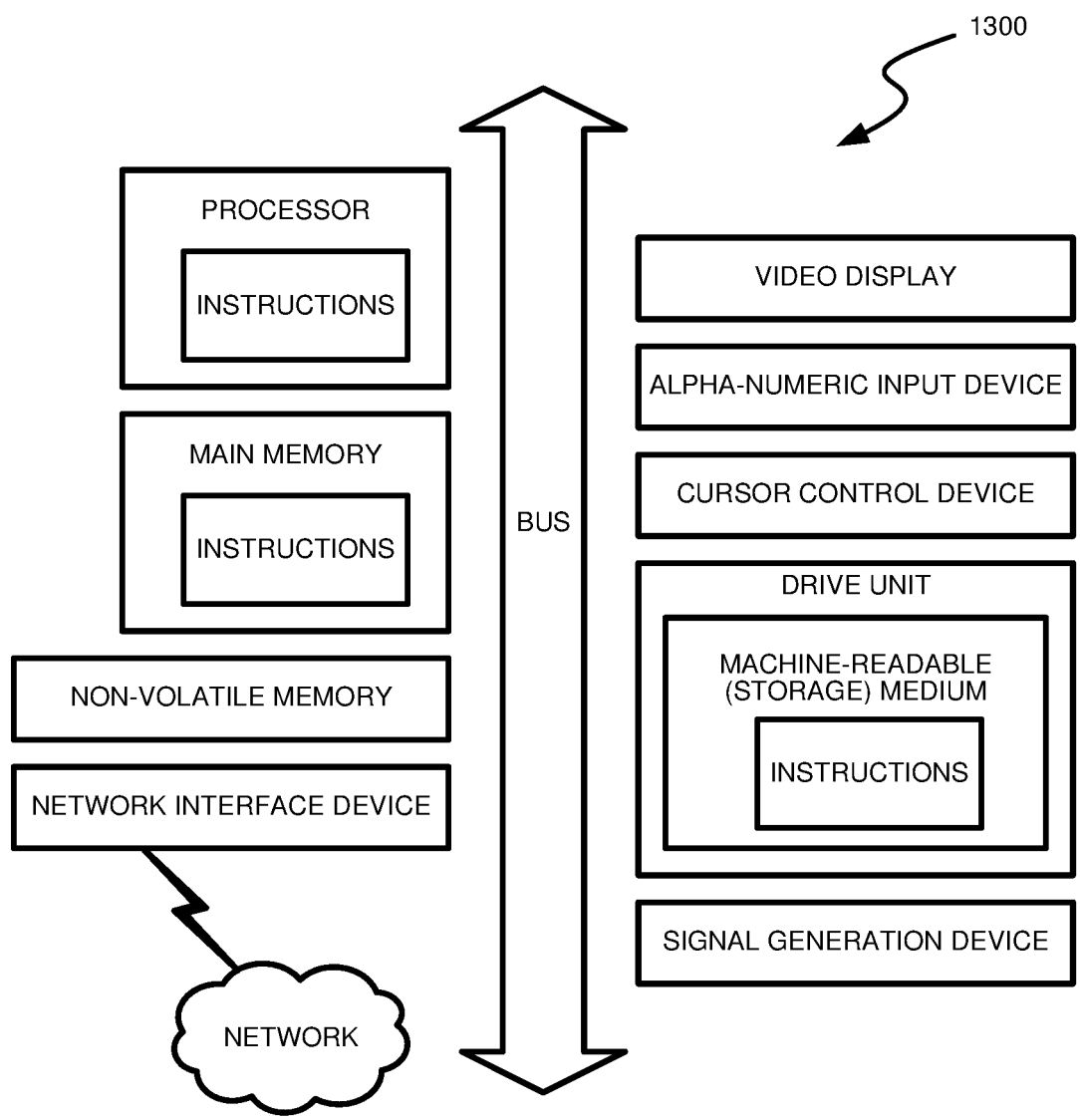
FIG. 13 depicts a diagrammatic representation of a machine, in the example form, of a computer system within which a set of instructions, for causing the machine to perform any one or more of the methodologies discussed herein, may be executed.

FIG. 13 depicts a diagrammatic representation of a machine, in the example form, of a computer system within which a set of instructions, for causing the machine to perform any one or more of the methodologies discussed herein, may be executed.

In the example of FIG. 13, the computer system includes a processor, memory, non-volatile memory, and an interface device. Various common components (e.g., cache memory) are omitted for illustrative simplicity. The computer system 1300 is intended to illustrate a hardware device on which any of the components depicted in the example of FIG. 1 (and any other components described in this specification) can be implemented. For example, the computer system can be any radiating object or antenna array system. The computer system can be of any applicable known or convenient type. The components of the computer system can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1300. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 13 reside in the interface.

In operation, the computer system 1300 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for".) Accordingly, the applicant reserves the right to add additional claims after filing the application to pursue such additional claim forms for other aspects of the disclosure.

The detailed description provided herein may be applied to other systems, not necessarily only the system described above. The elements and acts of the various examples described above can be combined to provide further implementations of the invention. Some alternative implementations of the invention may include not only additional elements to those implementations noted above, but also may include fewer elements. These and other changes can be made to the invention in light of the above Detailed Description. While the above description defines certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention.

What is claimed is:

1. A dual-mode wireless power receiver apparatus comprising:
    one or more radio frequency (RF) transceivers;
    an active energy harvesting component including a primary rectification circuit, and operable to:
        direct the one or more RF transceivers to establish a connection with a wireless power transmission system;
        transmit a beacon signal to the wireless power transmission system;
        receive and process directed wireless power transmitted by the wireless power transmission system via one or more paths in response to the beacon signal; and
        store the received wireless power in an energy storage device;
    a passive energy harvesting component operable to harvest and store ambient energy in the energy storage device; and
    switching circuitry including a switch, and operable to:
        enable the active energy harvesting component during an active harvest mode; and
        enable the passive energy harvesting component during a passive harvest mode,
        wherein the switching circuitry further includes a peak detector circuit operable to bias the switch to connect to the primary rectification circuit upon receipt of directed wireless power by the active energy harvesting component.

2. The dual-mode wireless power receiver apparatus of claim 1, wherein the switching circuitry comprises control circuitry operable to determine a mode of the dual-mode wireless power receiver apparatus.

3. The dual-mode wireless power receiver apparatus of claim 2, wherein the control circuitry is further operable to enable the active harvest mode when the dual-mode wireless power receiver apparatus is in an idle state or an active state.

4. The dual-mode wireless power receiver apparatus of claim 2, wherein the control circuitry is further operable to enable the active harvest mode when the dual-mode wireless power receiver apparatus is in an active state.

5. The wireless power receiver apparatus of claim 2, wherein the control circuitry comprises a monitor operable to: determine when power stored in the energy storage device is less than an active power threshold, and responsively direct the dual-mode wireless power receiver apparatus to a low-power state, wherein the passive harvest mode is enabled in the low-power state.

6. The dual-mode wireless power receiver apparatus of claim 5, wherein, while in the low-power state, the monitor is further operable to determine when the power stored in the energy storage device meets or exceeds a wake-up power threshold.

7. The dual-mode wireless power receiver apparatus of claim 6, wherein, when the energy stored in the energy storage device meets or exceeds the wake-up power threshold, the control circuitry is further operable to direct the dual-mode wireless power receiver apparatus to wake-up.

8. The dual-mode wireless power receiver apparatus of claim 6, wherein the control circuitry is further operable to detect one or more successive failed wake-up attempts.

9. The dual-mode wireless power receiver apparatus of claim 8, wherein the control circuitry is further operable to adjust the wake-up power threshold in response to detecting the one or more successive failed wake-up attempts.

10. The dual-mode wireless power receiver apparatus of claim 2, wherein the control circuitry is further operable to enable the passive harvest mode when the dual-mode wireless power receiver apparatus is in an idle state.

11. A dual-mode wireless power receiver apparatus comprising:
    peak detector circuitry communicatively coupled with one or more antennas, and operable to detect presence of a radio frequency (RF) field;
    one or more active energy harvesting components including a primary rectification circuit, the one or more active energy harvesting components enabled when the RF field is greater than an ambient threshold, the one or more active energy harvesting components operable to:
        receive and process directed wireless power from a wireless power transmission system via one or more paths; and
        store the received wireless power in an energy storage device;
    one or more passive energy harvesting components enabled when the RF field is less than the ambient threshold, the one or more passive energy harvesting components operable to harvest and store ambient energy in the energy storage device; and
    switching circuitry including: a switch, and a peak detector circuit operable to bias the switch to the primary rectification circuit upon receipt of directed wireless power by the one or more active energy harvesting components.

12. The dual-mode wireless power receiver apparatus of claim 11, further comprising the one or more antennas.

13. The dual-mode wireless power receiver apparatus of claim 11, further comprising a radio operable to:
    direct the one or more antennas to establish a connection with the wireless power transmission system; and
    transmit a beacon signal to the wireless power transmission system,
        wherein the directed wireless power is received responsive to the beacon signal.

14. The dual-mode wireless power receiver apparatus of claim 13, further comprising: an RF switch operable to enable the primary rectification circuit or the radio.

15. The dual-mode wireless power receiver apparatus of claim 11, further comprising one or more matching circuits.

16. The dual-mode wireless power receiver apparatus of claim 15, wherein the matching circuits are dynamically tunable.

17. A method of operating a dual-mode wireless power receiver client, the method comprising:
    detecting that a power level of an energy storage device of the dual-mode wireless power receiver client is less than an active power threshold value;
    responsive to the power level being less than the active power threshold value, directing the dual-mode wireless power receiver client to transition to a low-power state;
    in the low-power state and a passive harvest mode, passively harvesting and storing ambient energy in the energy storage device;
    detecting that the power level of the energy storage device exceeds a wake-up power threshold value;
    responsive to the power level of the energy storage device exceeding the wake-up power threshold value, directing the dual-mode wireless power receiver client to wake-up from the low-power state,
        wherein directing the dual-mode wireless power receiver client to wake-up from the low-power state includes transitioning the dual-mode wireless power receiver client from the passive harvest mode to an active harvest mode; and in the active harvest mode:
receiving wireless power transmitted by a wireless power transmission system via one or more paths; and
storing the received wireless power in the energy storage device, wherein the dual-mode wireless power receiver includes a primary rectification circuit, a peak detector circuit, and a switch, and wherein transitioning the dual-mode wireless power receiver client from the passive harvest mode to the active harvest mode includes:
biasing, by the peak detector circuit, the switch to connect to the primary rectification circuit in response to receiving the wireless power transmitted by the wireless power transmission system.

18. The method of claim 17, further comprising determining if the wake-up attempt is successful.

19. The method of claim 18, further comprising dynamically adjusting the wake-up threshold responsive to one or more successive unsuccessful wake-ups.

20. The method of claim 17, further comprising, prior to receiving the wireless power from the wireless power transmission:
establishing communication with the wireless power transmission system; and
transmitting a beacon signal to the wireless power transmission system,
wherein the wireless power is transmitted by the wireless power transmission in response to the beacon signal.

* * * * *